Dec. 2, 1952   P. G. FELIX   2,619,842
VARIABLE-SPEED DRIVE FOR MACHINE TOOLS
Filed June 10, 1950   2 SHEETS—SHEET 1

INVENTOR.
PAUL C. FELIX
BY
Oltsch & Knoblock
ATTORNEYS

Patented Dec. 2, 1952

2,619,842

UNITED STATES PATENT OFFICE 2,619,842

VARIABLE-SPEED DRIVE FOR MACHINE TOOLS

Paul C. Felix, Elkhart, Ind., assignor to Sibley Machine and Foundry Corporation, South Bend, Ind., a corporation of Indiana Application June 10, 1950, Serial No. 167,452

2 Claims. (Cl. 74—230.17)

This invention relates to improvements in variable speed drive for machine tools, and more particularly to a drive of this character adapted for use upon a drilling machine.

The primary object of the invention is to provide a novel construction of a mounting for a variable pulley characterized by simplicity of construction, reduction of cost compared to the cost of conventional variable pulley drives, and compactness of arrangement to facilitate reduction in size.

A further object is to provide a variable speed drive mechanism of the belt driven type having a substantially flat or cylindrical pulley and a V-pulley formed of parts adjustable relative to each other and normally spring urged toward each other, wherein one of said pulleys is carried by a mounting pivoted to a support to be swung toward and from the other pulley for the purpose of controlling the speed ratio of the drive between the pulleys.

Other objects will be apparent from the following specification.

Figures 1, 4:
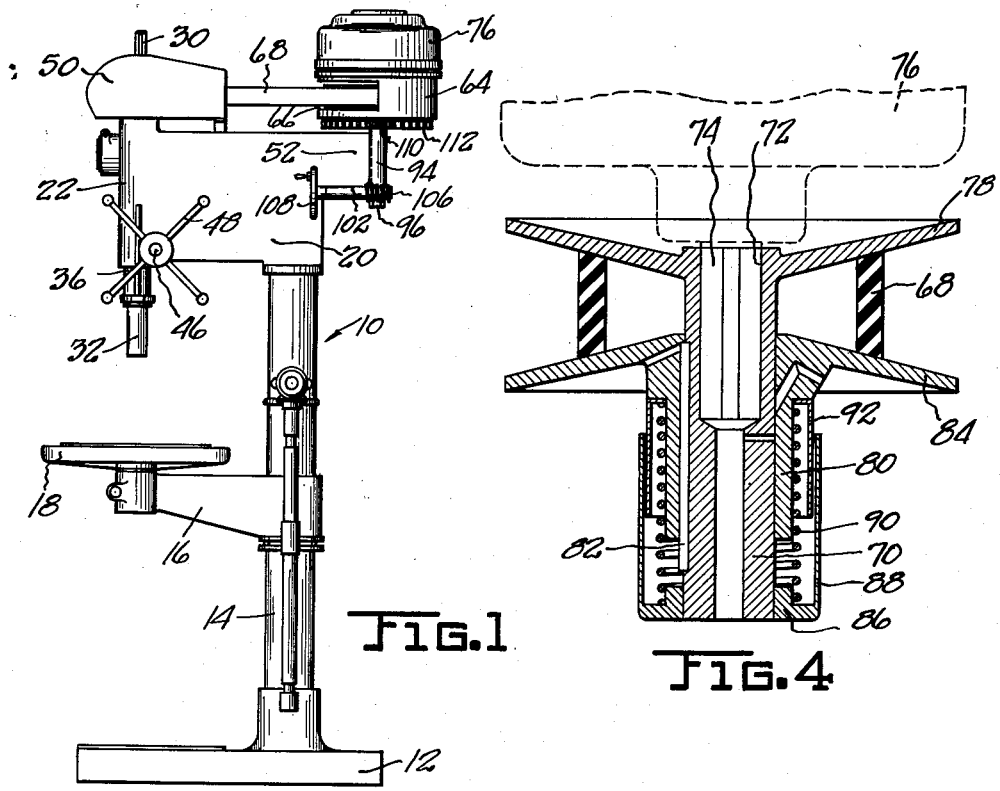
Fig. 1 is a side view illustrating the incorporation of the invention in a drilling machine.
Fig. 4 is an enlarged detail axial sectional view of an adjustable pulley.
Figure 2:
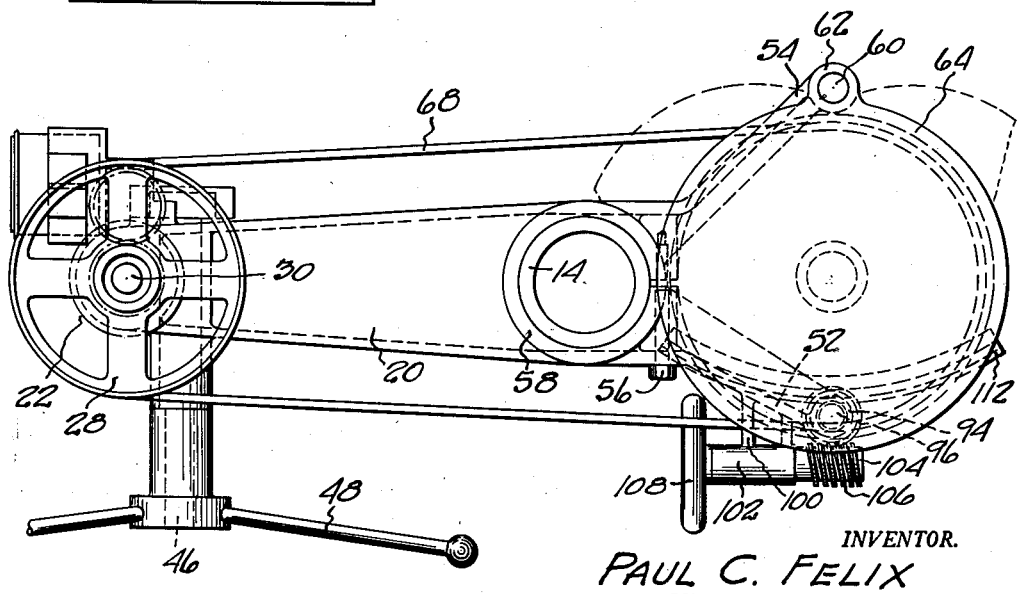
Fig. 2 is an enlarged fragmentary top view illustrating the drive mechanism.
Figure 3:
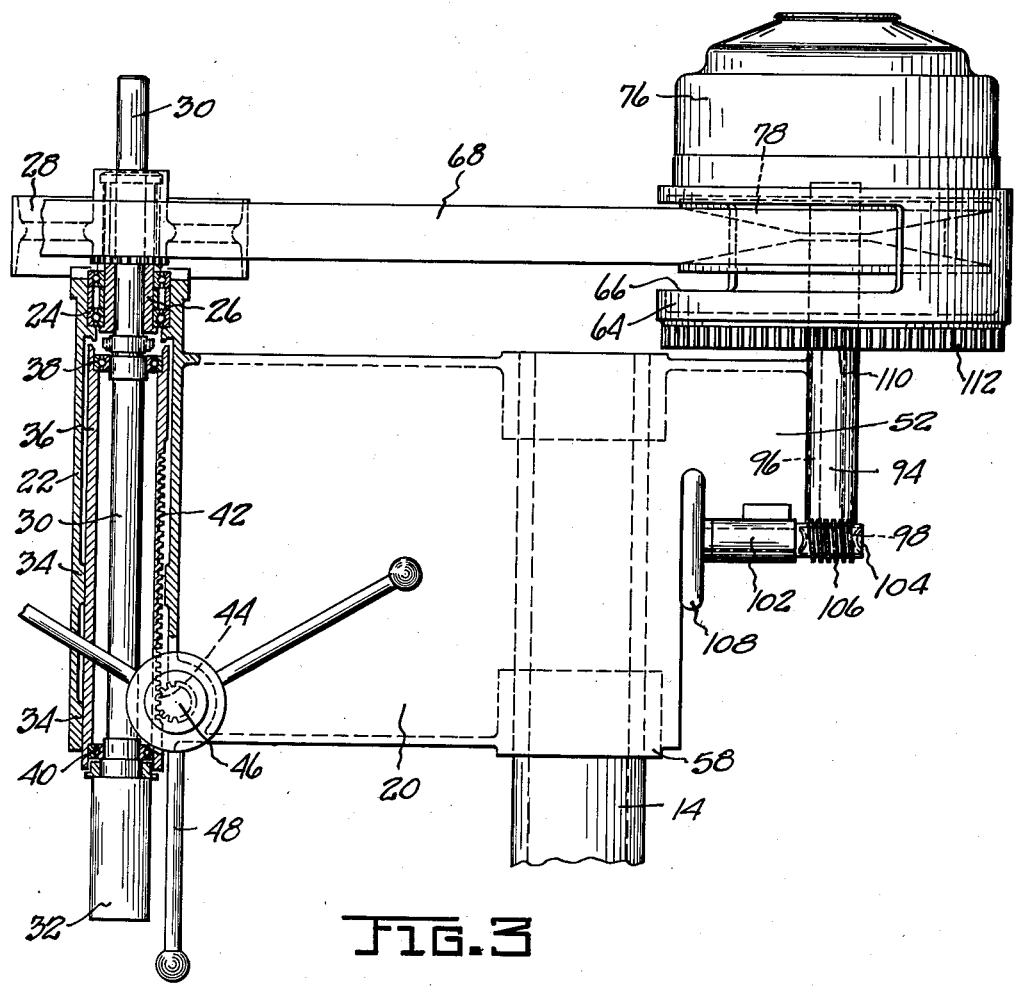
Fig. 3 is an enlarged fragmentary side view illustrating the invention with parts thereof illustrated in section.

Referring to the drawings which illustrate the preferred embodiment of the invention, the numeral 10 designates a drilling machine which may be of any suitable character. In the form illustrated, the machine includes a base 12 supporting an upright standard 14 upon which is mounted at an intermediate level a forwardly projecting arm or support 16 for mounting a horizontal work support member 18. At its upper end the standard mounts a main top frame 20 which includes a spindle housing 22 of any suitable construction.

A spindle unit of any suitable character is mounted in the spindle housing. In the construction illustrated a bearing unit 24 mounted within the upper end of the spindle housing 22 journals the hub portion 26 of a pulley 28, here illustrated as a flat or substantially cylindrical pulley. An elongated spindle 30 is splined in the pulley hub 26. The spindle 30, being positioned in substantially axial alignment with the work holder 18, extends through the spindle housing 22 and projects therebelow to terminate in a chuck unit 32 at its lower end, said chuck being of any type found suitable for the purpose of carrying a tool or the like. The spindle housing 22 is characterized by internal circumferential ribs or reduced portions 34 which form guides for a tubular member or quill 26. A bearing 38 is carried within the upper end of the quill 36 to journal an intermediate portion of the spindle 30, and a bearing 40 is mounted within the lower part of the quill to journal the lower end of the spindle 30. The quill or tube 36 has a longitudinal set of gear teeth 42 formed therein to constitute a rack, and a pinion 44 meshes with that rack 42. The pinion is mounted upon a shaft 46 suitably journaled in the main upper frame 20 and mounts upon its outer end a hand wheel or multiple armed lever 48 whose rotation is effected manually and serves to rotate the pinion 44 for the purpose of raising and lowering the quill 36 and the spindle 30 together with the tool or member which is carried by the spindle chuck 32. If desired, a hood 50 may be mounted removably upon the main frame 20 for concealing or enclosing the pulley 28 and associated parts.

A frame 20 of the machine also includes a pair of portions 52 and 54 extending divergently rearwardly from the frame portion embracing the standard 14 and adapted to be drawn toward each other at their inner ends by means of bolts 56, for the purpose of effecting clamping of the socket portion 58 of the upper frame portion 20 upon the standard 14. The arm 54 terminates in a socket portion which mounts a vertical pin or stud shaft 60. The shaft 60 journals a laterally projecting ear portion 62 carried by a pulley housing 64. The pulley housing 64 may be of any construction found suitable and, as here illustrated, is of substantially cylindrical or drumlike hollow form, having a cut-out 66 in its cylindrical wall of approximately 180 degrees extent so as to permit ingress and egress of a drive belt 68 which passes around the pulley 28 and around a separable pulley unit of the character illustrated in Fig. 4.

The pulley illustrated in Fig. 4 is a separable or variable pulley and may be of any suitable construction. As here illustrated, the pulley includes an elongated hub portion 70 providing at one end thereof a socket portion 72 adapted for splined connection with the drive arbor 74 of a drive motor 76. The motor 76 is preferably of the construction which has a small axial dimension for compactness of size, and for this purpose an axial air gap alternating current induction motor has been found to be particularly desirable because of its small axial size. The motor 76 will be mounted upon the upper end of the variable pulley housing 64 in any manner found suitable.

At the end of the hub 70 in which the splined motor arbor receiving socket 72 is formed, the hub 70 has secured thereto, and preferably formed integrally therewith, a frusto conical member 78 having its concave or cup-shaped surface positioned outermost relative to the hub 70. A sleeve 80 has a guided slide fit upon the hub 70 and has a splined connection 82 which accommodates axial movement of the sleeve 80 but prevents rotation of the sleeve relative to the hub 70. At one end the sleeve 80 has fixedly connected thereto and preferably integrally formed therewith, a frusto conical member 84 of a size and shape complementary to the shape of the frusto conical member 78 and positioned oppositely relative thereto so as to cooperate with the flange 78 to provide a V-pulley. The end of the hub fixedly mounts a ring 86 having a radially outwardly projecting flange mounting a substantially cylindrical member 88 extending clear of the sleeve 80. The member 86, 88 forms an abutment for one end of a coil spring 90 whose opposite end presses against a shoulder formed at the junction of the sleeve 80 and the pulley flange 84. The spring 90 serves normally to urge the flange 84 into abutment at its central portion with the flange 78. As here illustrated, a cylindrical shield 92 is carried by the sleeve 80 and encircles the spring 90, the member 92 preferably having a telescopic fit within the cylindrical part 88 carried by the hub 70. The belt 68 is trained around the pulley defined by the flanges 78, 84, as best illustrated in Fig. 4.

The arm or fork 52 of the main upper frame 20 has a socket 94 at its outer end which journals a vertical shaft 96. The lower projecting end of the shaft mounts a worm gear 98. A plurality of ribs 100 project forwardly from the arm 52 at the lower edge thereof and carry the socket portion 102 having a horizontal axis. A shaft 104 is journaled in the sleeve 102 and carries a worm 106 which meshes with the worm gear 98. The shaft 104 also carries the hand wheel 108 by means of which adjustment of the shaft 104 is effected.

The vertical shaft 96 projects above the upper end of the frame socket portion 94 and mounts a pinion 110. The pinion 110 meshes with an arcuate rack 112 projecting below the pulley housing 68 and fixed thereto. The rack 112 is concentric with the pivot shaft 60.

The pulley housing 64 is of an axial or vertical dimension sufficient to receive the spring pressed variable pulley to accommodate maximum axial adjustment or separation of the pulley flanges 78, 84 against the action of the spring 90. The width of the housing opening 66 is such as to accommodate a change in the position of the belt 68, namely, a lowering of the position of the belt as occurs when the pulley flanges 78, 84 are spread. Observe also that the flat pulley 28 is of a width substantially greater than the width of the belt 68 so that it also will accommodate raising and lowering of the position of the belt incident to adjustment of the V-pulley parts 78, 84.

It will be apparent that infinite adjustment of the drive speed can be accomplished by a simple manipulation or rotation of the hand wheel 108. The hand wheel 108 rotates the shaft 104 and the worm 106. The worm gear 98 meshing with the worm 106 is rotated and rotates therewith the shaft 96 and the pinion 110. The rotation of the pinion 110, which meshes with the rack 112, causes bodily movement of that rack about the shaft 60 as a center and thereby swings the pulley housing 64 bodily. If the swinging movement of the housing 64 is in a direction away from the pulley 28 and the spindle 30, the belt 68 between the flanges 78, 84 of the spring pressed adjustable pulley serves to spread the pulley flanges 78, 84 incident to the movement of the rack and the pulley housing. Stated differently, the belt acts as a wedge which slides over the convex or inner surfaces of the pulley flanges 78, 84 and causes the pulley flange 84 and its sleeve 80 to slide lengthwise of the hub 70 against the action of the spring 90. The belt thus finds its own position and a new speed ratio of the drive transmitted from the motor shaft to the drive spindle 30 is effected.

When the hand wheel 108 is rotated in the opposite direction to swing the casing 64 toward the spindle 30, the belt engaging surfaces of the pulley flanges 78, 84 serve as cams which, coupled with the centrifugal force exerted due to rotation of the pulley, effect an adjustment of the engagement of the belt with the pulley to the maximum radial spacing from the hub 70 which is permitted by the length of the belt 68. It will be understood that the adjustments in each case will preferably be made while the motor is operating, and that is particularly desirable where the adjustment is effected in a manner to swing the variable pulley toward the spindle 30. Rotation of the parts is not absolutely essential, however, inasmuch as the parts will operate to complete the adjustment as soon as the motor is started following adjustment made while the parts are stationary.

It will be observed that this construction is simple and that an effective guiding of the parts is accomplished by swinging of the adjusting unit about the shaft 60 which is the sole means for controlling the position which the parts assume throughout the full range of adjustment thereof. In other words, the construction avoids the necessity of use of longitudinal ways for effecting bodily movement of the belt connected pulleys, one toward the other, and relies entirely upon circular or cylindrical surfaces and pivoting about fixed axes. The construction thus reduces the labor required to fabricate and assemble the device, reducing its cost and also reduces the dimension of the device.

While the preferred embodiment of the invention has been illustrated and described, it will be understood that changes in construction may be made within the scope of the appended claims without departing from the spirit of the invention.

I claim:

1. A variable speed belt drive for a machine having a frame including a pair of projecting parts, comprising a driven pulley journaled on said frame about a fixed vertical axis spaced from said projecting parts, an adjustable V-pulley spring pressed toward restricted axial dimension, a belt trained around said pulleys, a support mounting said V-pulley and pivoted to one of the projecting parts of said frame on an axis substantially parallel to and spaced from said pulley axis, a drive motor carried by said support and driving said V-pulley, and means for locking said support in selected position including a member carried by the other projecting part and a member carried by said support, said support constituting a housing encasing said V-pulley and having a belt-receiving opening wider than said belt to accommodate lateral shifting of said belt incident to adjustment of the V-pulley.

2. A variable speed belt drive for a machine having a frame, comprising a driven pulley journaled on said frame about a fixed vertical axis, an adjustable V-pulley spring pressed toward restricted axial dimension, a belt trained around said pulleys, a casing mounting said V-pulley and pivoted at the margin thereof to said frame on an axis substantially parallel to and spaced from said pulley axis, said casing having a belt-receiving opening wider than said belt, a drive motor mounted in said casing and driving said V-pulley, an arcuate rack carried exteriorly by said casing and concentric with the pivot axis of said casing, a pair of angularly disposed journals carried by said frame, a shaft rotatable in each journal, a worm and worm gear connection between said shafts, a manually manipulated member mounted on one shaft, and a pinion mounted in the other shaft and meshing with said rack.

PAUL C. FELIX.

REFERENCES CITED

The following references are of record in the file of this patent:

UNITED STATES PATENTS

| Number | Name | Date |
| --- | --- | --- |
| 2,080,319 | Kingsbury | May 11, 1937 |
| 2,203,149 | Hoover | June 4, 1940 |
| 2,422,196 | Heyer | June 17, 1947 |
| 2,464,841 | Alexander | Mar. 22, 1949 |
| 2,491,745 | Locke | Dec. 20, 1949 |